United States Patent
Daminelli et al.

(10) Patent No.: US 11,161,425 B2
(45) Date of Patent: Nov. 2, 2021

(54) POWER EQUIPMENT FOR ELECTRIC VEHICLES

(71) Applicant: Dazetechnology S.R.L., Bergamo (IT)

(72) Inventors: Andrea Daminelli, Bergamo (IT); Giacomo Zenoni, Bergamo (IT)

(73) Assignee: Dazetechnology S.R.L., Bergamo (IT)

( * ) Notice: Subject to any disclaimer, the term of this patent is extended or adjusted under 35 U.S.C. 154(b) by 412 days.

(21) Appl. No.: 16/334,590

(22) PCT Filed: Sep. 15, 2017

(86) PCT No.: PCT/IB2017/055606
§ 371 (c)(1),
(2) Date: Mar. 19, 2019

(87) PCT Pub. No.: WO2018/055498
PCT Pub. Date: Mar. 29, 2018

(65) Prior Publication Data
US 2021/0284036 A1 Sep. 16, 2021

(30) Foreign Application Priority Data
Sep. 20, 2016 (IT) .......................... 102016000094418

(51) Int. Cl.
*H02J 7/00* (2006.01)
*H02J 7/14* (2006.01)
(Continued)

(52) U.S. Cl.
CPC ............... *B60L 53/35* (2019.02); *B60L 53/16* (2019.02); *B60L 50/66* (2019.02)

(58) Field of Classification Search
USPC .................................................. 320/109, 134
See application file for complete search history.

(56) References Cited

U.S. PATENT DOCUMENTS

| | | | |
|---|---|---|---|
| 5,821,731 A * | 10/1998 | Kuki ....................... | B60L 53/31 320/108 |
| 7,999,506 B1 * | 8/2011 | Hollar ..................... | B60L 53/35 320/104 |

(Continued)

FOREIGN PATENT DOCUMENTS

| | | |
|---|---|---|
| DE | 102010028126 A1 | 10/2011 |
| DE | 102014226755 A1 | 6/2016 |

(Continued)

OTHER PUBLICATIONS

PCT International Search Report and Written Opinion, Application No. PCT/IB2017/055606, dated May 3, 2018.

*Primary Examiner* — Alexis B Pacheco
(74) *Attorney, Agent, or Firm* — MacMillan, Sobanski & Todd, LLC

(57) ABSTRACT

Power equipment for electric vehicles (2), comprising: a first electrical connector (3) connected to an electric power supply grid; a second electrical connector (4) connected to a battery of the vehicle (2) and configured to mechanically couple to the first electrical connector (3); actuating means (9) of said first connector (3) for actuating the first connector (3) between a first condition in which it is removed from the second connector (4) to a second condition in which it is coupled to the second connector (4) to determine a passage of current from the electric grid to said battery; and a support body (10) of said actuating means (9), said first connector (3) and said actuating means (9) in the first condition being contained in the volume defined by said support body (10), said support body (10) has a support base (11) configured to be fastened to a parking surface of the vehicle (2) and underneath the vehicle (2) itself.

15 Claims, 11 Drawing Sheets

(51) Int. Cl.
    *B60L 53/35*     (2019.01)
    *B60L 53/16*     (2019.01)
    *B60L 50/60*     (2019.01)

(56) References Cited

U.S. PATENT DOCUMENTS

| | | | | |
|---|---|---|---|---|
| 8,307,967 | B2* | 11/2012 | Patwardhan | B60L 53/14 191/2 |
| 8,441,154 | B2* | 5/2013 | Karalis | H02J 50/80 307/104 |
| 9,056,555 | B1* | 6/2015 | Zhou | B60L 53/00 |
| 10,093,195 | B2* | 10/2018 | Ricci | H02J 7/00034 |
| 10,099,566 | B2* | 10/2018 | Wu | B60L 53/124 |
| 2012/0286730 | A1* | 11/2012 | Bonny | B60L 53/35 320/109 |
| 2013/0076902 | A1* | 3/2013 | Gao | B25J 9/042 348/148 |
| 2013/0249470 | A1* | 9/2013 | Martin | B60L 11/182 320/107 |
| 2014/0354229 | A1* | 12/2014 | Zhao | B60L 53/126 320/109 |
| 2016/0339791 | A1* | 11/2016 | Sim | H02J 50/90 |
| 2017/0259678 | A1* | 9/2017 | Cao | B60L 53/35 |
| 2018/0015836 | A1* | 1/2018 | Madon | B60L 53/18 |

FOREIGN PATENT DOCUMENTS

| | | | |
|---|---|---|---|
| JP | 3231546 | B2 | 11/2001 |
| JP | 2003061253 | A | 2/2003 |
| WO | 2015128450 | A1 | 9/2015 |

\* cited by examiner

POWER EQUIPMENT FOR ELECTRIC VEHICLES

This is a national stage application filed under 35 U.S.C. § 371 of international application PCT/IB2017/055606, filed under the authority of the Patent Cooperation Treaty on Sep. 15, 2017, published; which claims the benefit of Italy Patent Application No. 102016000094418 filed Sep. 20, 2016. The entire disclosures of all the aforementioned applications are expressly incorporated herein by reference for all purposes.

FIELD OF INVENTION

The present equipment relates to power equipment for electric vehicles.

In further detail, the present invention relates to equipment used in particular for electric motor vehicles for the purpose of associating a power supply grid to one or more electric batteries mounted on the vehicle.

BACKGROUND OF THE INVENTION

As is well known, power equipment for electric vehicles consists of at least one electric connector, typically male, operatively associated through an electric cord to a power supply grid (home or public).

The connector is adapted to be mechanically coupled to a female connector (electrical outlet) positioned at a region of the vehicle that is accessible from the exterior.

In addition, to provide appropriate charging stations in public parking areas, supports are utilised such as columns, emerging from the ground and positioned at vehicle parking spaces.

The charging columns, in addition to being utilised to support the cord and cover the respective electric wirings with the power supply grid, can be provided with automatic systems for winding/unwinding the cord. In this way, once the vehicle is positioned in proximity to the column, the operator manually couples the connector connected to the electric cord to the outlet of the vehicle. In this operation, the electric cord is pulled and unwound to allow the electrical connection irrespectively of the position of the vehicle outlet.

In accordance with an additional type of power equipment, automatic systems are also known, able to define automatically the electrical coupling between connector and vehicle outlet.

These systems are equipped with robot arms, which contain the electric wirings and provide for the automatic actuation of the connector. The arms are commanded by an appropriate processing logic unit able to detect, by means of visualisation systems, the position of the electrical outlet of the vehicle and to move the connector accordingly.

In this way, once the vehicle is parked in proximity to the charging columns, the visualisation systems are activated to detect the position of the outlet and then send appropriate actuation commands to the arm.

To facilitate this operation, the vehicle is parked in a predefined position able to offer the most favourable condition for the robot arm to reach the outlet.

It should be noted, in fact, that automatic systems are not able to reach any area whatsoever of the vehicle, but only a determined area proximate to the aforementioned column.

For this reason, depending on the position of the vehicle outlet, the operator must necessarily place alongside the column the side of the vehicle where the outlet is fitted.

This condition therefore makes use of the automatic charging equipment described above inconvenient and inflexible.

Moreover, the known systems described above have an important drawback, derived from the overall bulk determined by the presence of the charging column itself.

It should be noted, in fact, that, especially in the public parking areas where numerous charging stations are provided, the car park is cluttered with a number of columns equal to the number of charging stations, with the consequent drawbacks in terms of encumbrance and hence ease of manoeuvring within the aforesaid parking areas.

In this context, the technical task at the basis of the present invention is to propose power equipment for electric vehicles that overcomes the aforementioned drawbacks of the prior art.

SUMMARY OF THE INVENTION

In particular, a purpose of the present invention is to make available power equipment for electric vehicles that is simple both structurally and in the automatic charging operations.

Yet another important purpose of the present invention is to make available charging equipment for electric vehicles, which does not determine any clutter in the parking areas provided for charging the aforesaid vehicle.

The technical task set out above and the specified purposes are substantially achieved by power equipment for electric vehicles and by a set, comprising the technical characteristics described in one or more of the appended claims. The dependent claims correspond to different embodiments of the invention.

BRIEF DESCRIPTION OF THE DRAWINGS

Further features and advantages of the present invention shall become more readily apparent from the indicative and therefore non-limiting description of advantageous but not exclusive embodiments of power equipment for electric vehicles, as illustrated in the accompanying drawings in which.

DETAILED DESCRIPTION OF THE INVENTION

Figure 2:
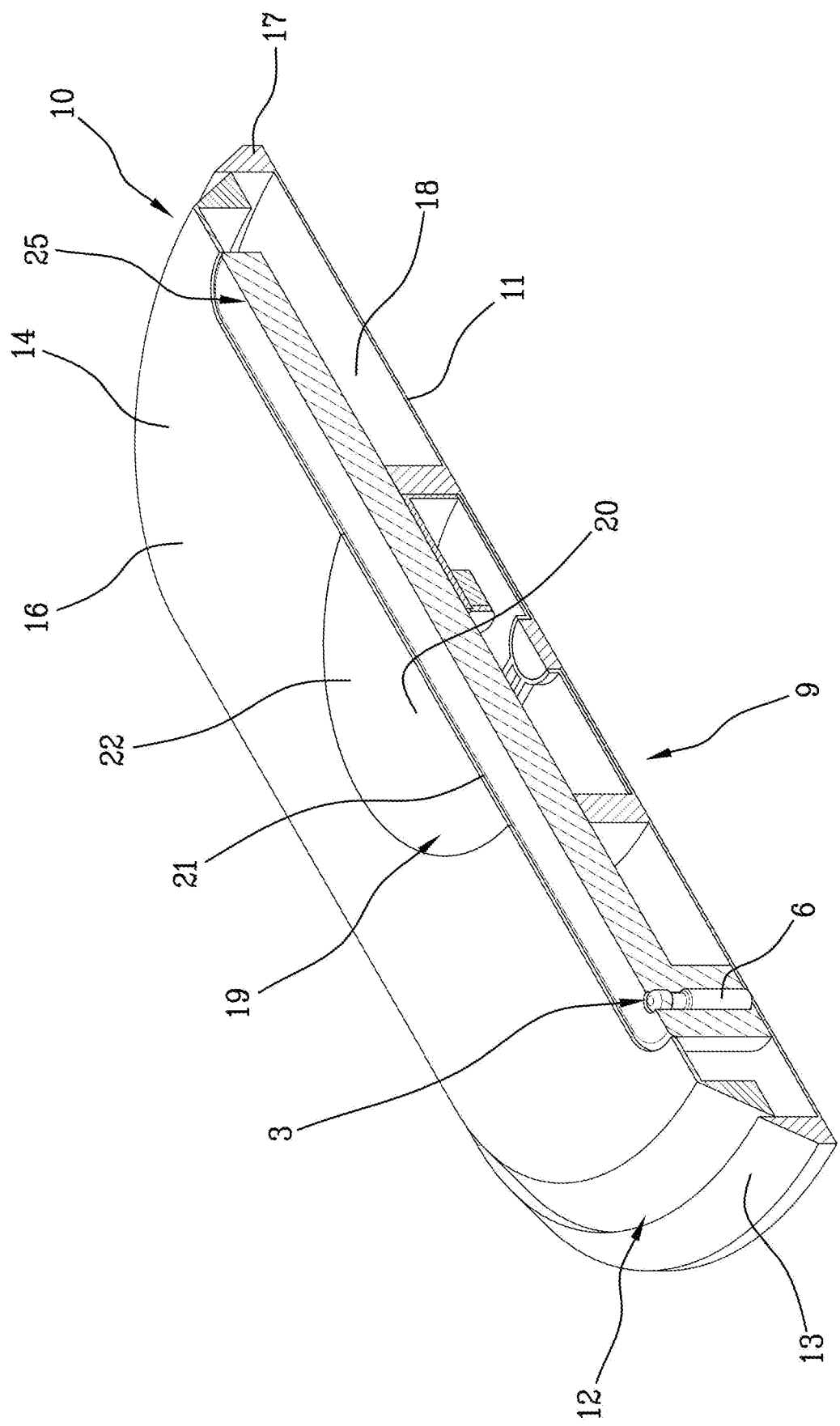
FIG. 2 is a perspective view in longitudinal section of the equipment of FIG. 1.

With reference to the accompanying FIG. 2, the numeral 1 globally indicates a power equipment for electric vehicles 2.

In particular, the present invention finds advantageous application for electric vehicles 2 such as motor vehicles. For this purpose, in FIG. 6 the equipment 1 is illustrated during an operating step in which it connects to a motor vehicle 2 illustrated solely by way of mere, non-limiting example.

In greater detail, with reference to FIGS. 2 through 5, the equipment 1 comprises a first electrical connector 3 connected to an electric power supply grid which is not shown because it is of a known type and it is not a part of the present invention. The electrical connections between the first connector 3 and the electric grid are not shown in the variants of FIGS. 1 through 6. In accordance with one embodiment, the electrical connections can be of any known type. For example, the first connector 3 could comprise a pin 6 having substantially cylindrical conformation with variable section.

Figure 6:
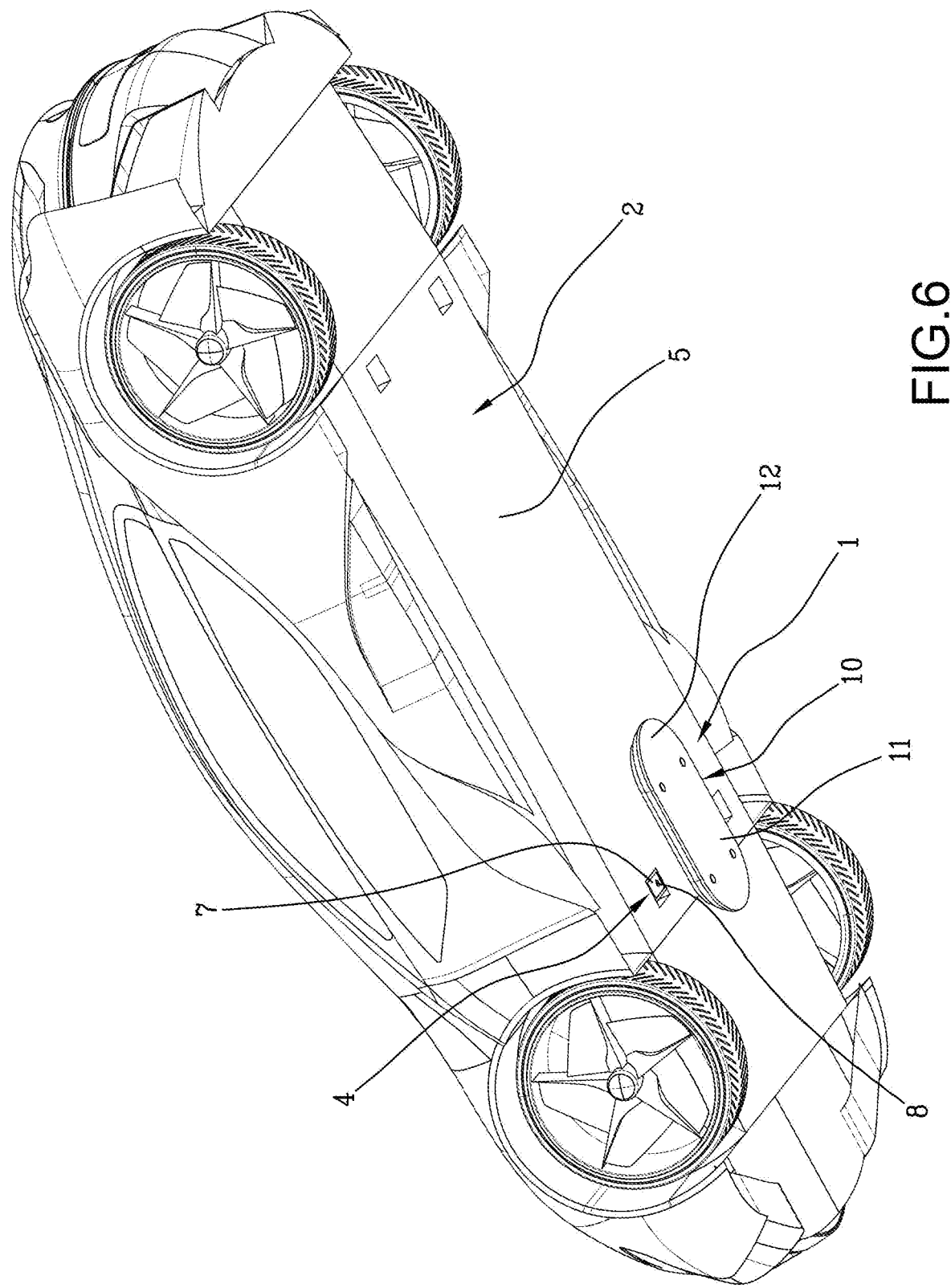
FIG. 6 shows a perspective bottom view of the equipment of FIG. 1 and of a respective vehicle to be powered.

With reference to FIG. 6, the equipment 1 further comprises a second electrical connector 4 connected to a battery of the vehicle 2 (also not illustrated because it is of a known type and is not part of the present invention) and configured to couple mechanically with the first electrical connector 3.

Advantageously, the second connector 4 is associated with an under-body surface 5 of the vehicle 2, i.e. the region of the vehicle that is lower and faces the ground.

In addition, in accordance with a possible embodiment, the second connector 4 comprises a support element 7, for example provided with a hole 8 for containing the aforementioned pin 6. In accordance with a variant, the connector 3 and the inner surface of the hole 8 are made of an electrically conductive material to allow the passage of electricity in the condition in which the pin 6 is at least partially inserted in the hole 8 (according to some embodiments).

In accordance with one embodiment, the support element 7 could delimit a cavity 57 in which electrical tracks 35 of said connector 4 are fully contained.

Figure 16:
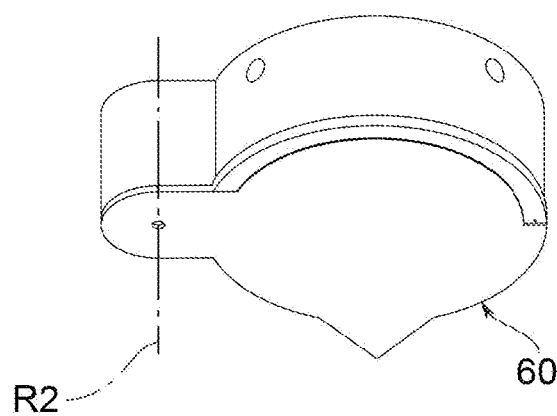
FIGS. 16, 17 show a second electrical connector, according to one embodiment, in two different operating positions.
Figure 17:
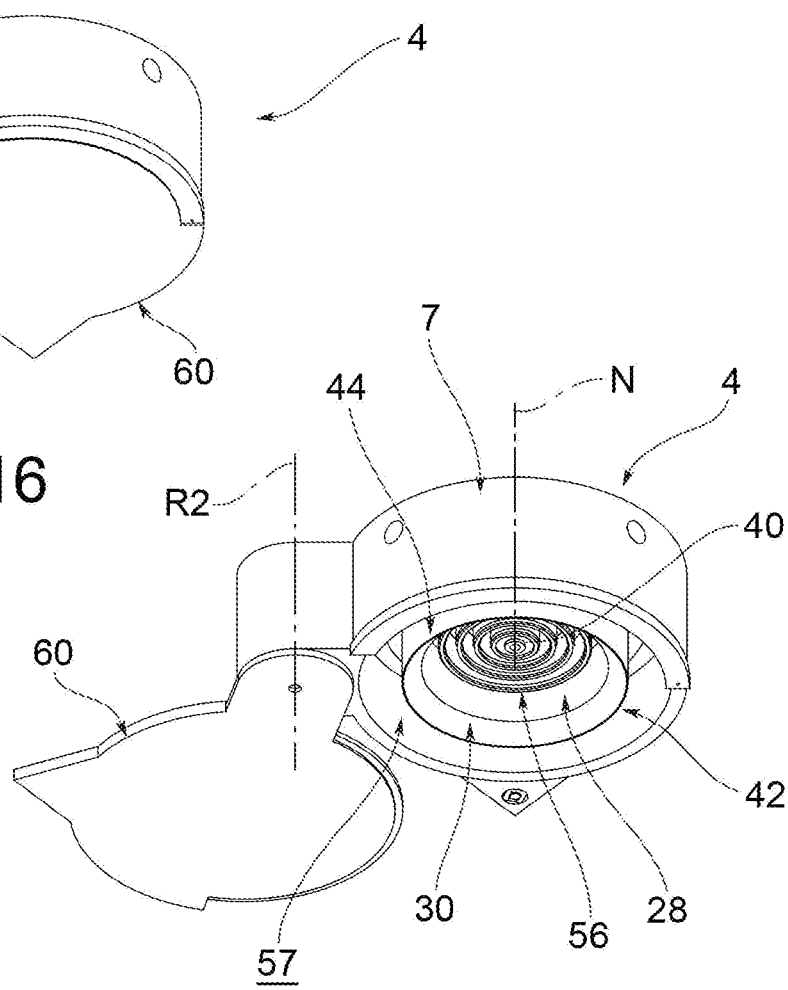
Figure 18:
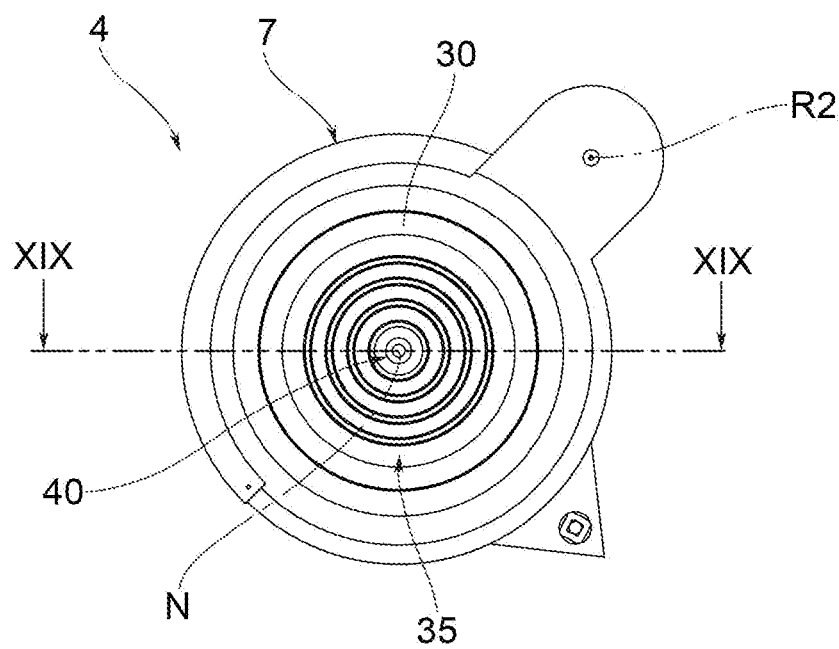
FIGS. 18, 19 respectively show a plan view of the second connector of FIG. 17 (in the absence of the mobile covering element) and a section along the plane XIX-XIX shown in FIG. 18.

In accordance with one embodiment, the second connector 4 could comprise a closing element 60 superposed to the cavity 57 so as to close it (FIG. 16), and openable (FIG. 17) so as to allow access to the electrical tracks 35.

In accordance with one embodiment, the closing element 60 could be motorised between the open position and the closed position, and vice versa.

In accordance with one embodiment, the closing element 60 could close the cavity in a sealed manner.

In other words, when the closing element 60 is superposed to the cavity 57, the electrical tracks 35 are enclosed in the support element 7 so as to exclude the entry of water/rain into the cavity 57.

For example, in accordance with one embodiment, the closing element 60 could close the cavity in a substantially watertight manner.

In accordance with one embodiment, the closing element 60 could be hinged to the support element 7 (around the axis of rotation R2).

In accordance with one embodiment (not shown), the closing element 60 could be slidable with respect to the support element 7.

Figure 8:
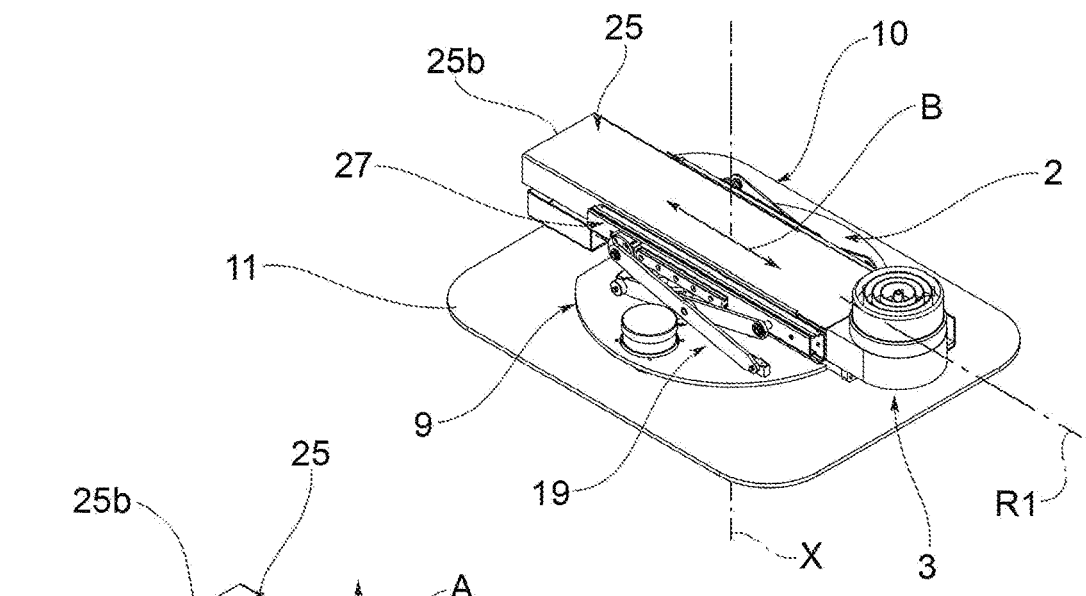
Figure 9:
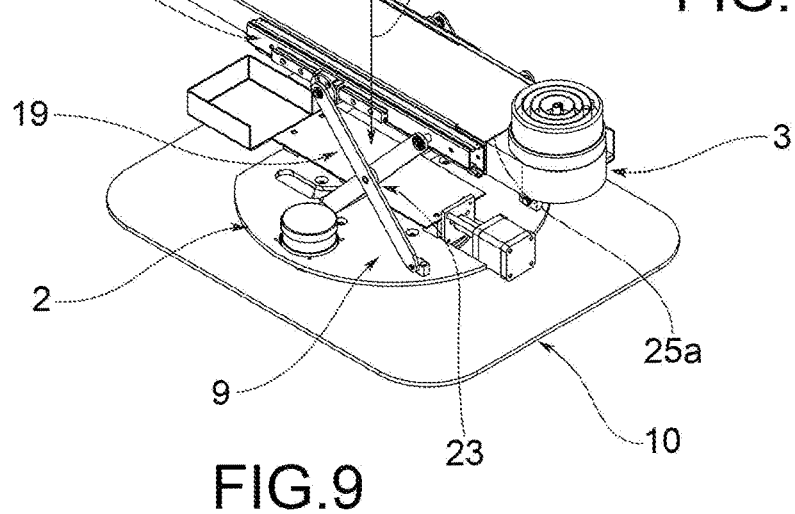
Figure 10:
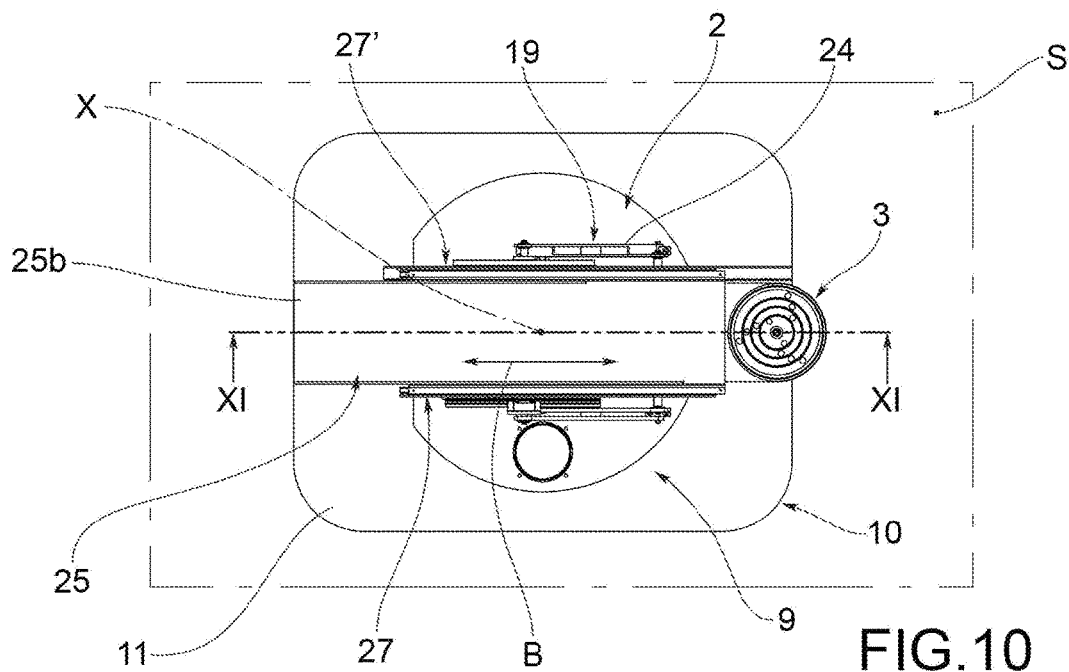
FIGS. 10, 11 represent the equipment shown in FIG. 9, respectively in a top view and in a section view along the plane XI-XI indicated in FIG. 10.
Figure 20:
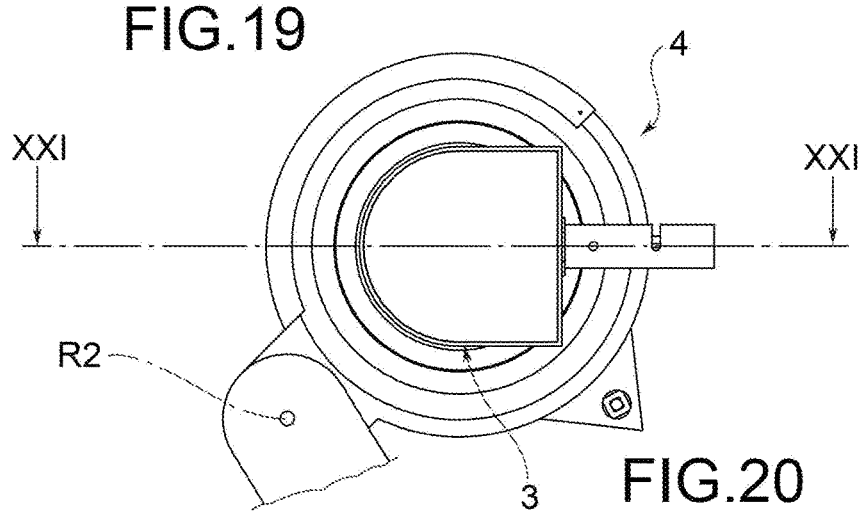
FIGS. 20, 21 show a plan view of a coupled condition of the first and of the second electrical connector, and a section along the plane XXI-XXI shown in FIG. 20.
Figure 21:
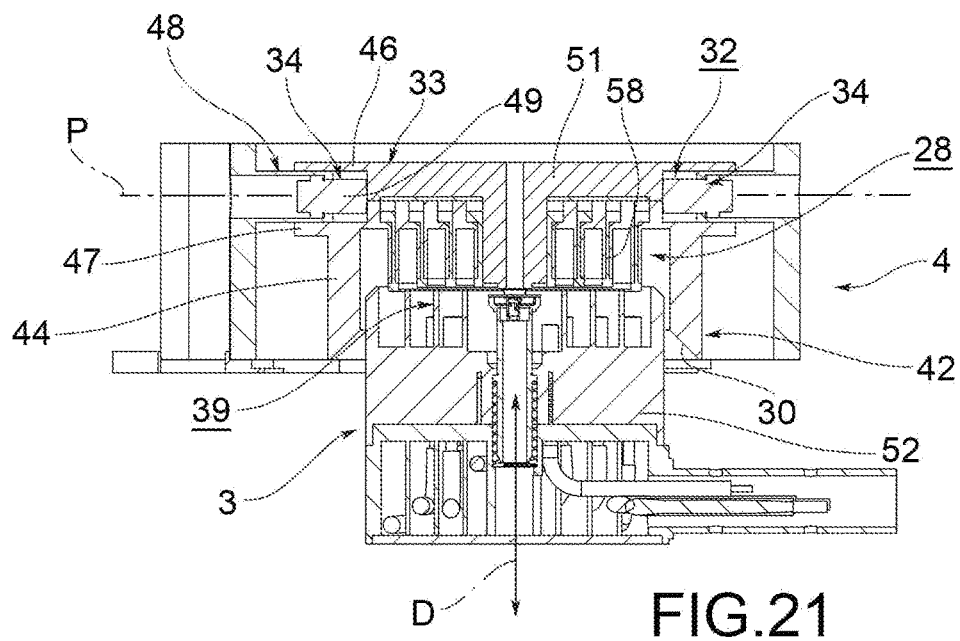

The equipment 1 further comprises means 9 for actuating the first electrical connector 3 to actuate the first connector 3 between a first condition in which it is moved away from the second connector 4 (for example, see FIG. 8) and a second condition in which it is coupled to the second connector 4 to determine a passage of current from the electric grid to the battery (as shown for example in FIGS. 20, 21). As specified above, in accordance with a variant the first connector 3 in the second condition is at least partially inserted in the hole 8 to define the electrical contact between the two connectors 3, 4.

It is specified that, within the present description, the expression "to determine a passage of current from the electric grid to the battery" shall mean "to allow a passage of current from the electric grid to the battery".

In other words, the first electrical connector 3 can be actuated from the first condition to the second condition (and vice versa) to achieve an electrical connection between the electric grid and the battery, or on the contrary to interrupt this connection.

In accordance with one embodiment, the passage of current in the second condition could be inverse, i.e. from the battery to the electric grid. Therefore, the direction of flow of the electric current is indifferent for the purposes of the present invention.

Advantageously, as shall be better specified below, the first connector 3 is actuated between the first and the second position along a respective direction, for example substantially vertical.

In the description that follows, reference shall be made to that direction as direction D of distancing/coupling of the first electrical connector 3 with respect to the second electrical connector 4. For example, the direction D is schematically shown in FIG. 21 with a double arrow.

In this way, the first connector 3 is actuated in the respective second condition, for example from the bottom towards the top, to be inserted into the hole 8 (according to a possible variant).

For this purpose, a support body 10 of the actuating means 9 is provided, able to internally contain the first connector 3 and the actuating means 9 in the respective first condition.

It is specified that, in the variants shown in FIGS. 7-11, the support body 10 was omitted for the sake of greater illustrative clarity.

In accordance with one embodiment, one between first or second electrical connector 4 delimits a housing compartment 28 in which the other electric connector (second or first 3) is inserted at least in part in the second coupling condition.

In accordance with one embodiment, the equipment could comprise mechanical centring means configured to align the other electrical connector 3 and the housing compartment 28.

Figure 19:
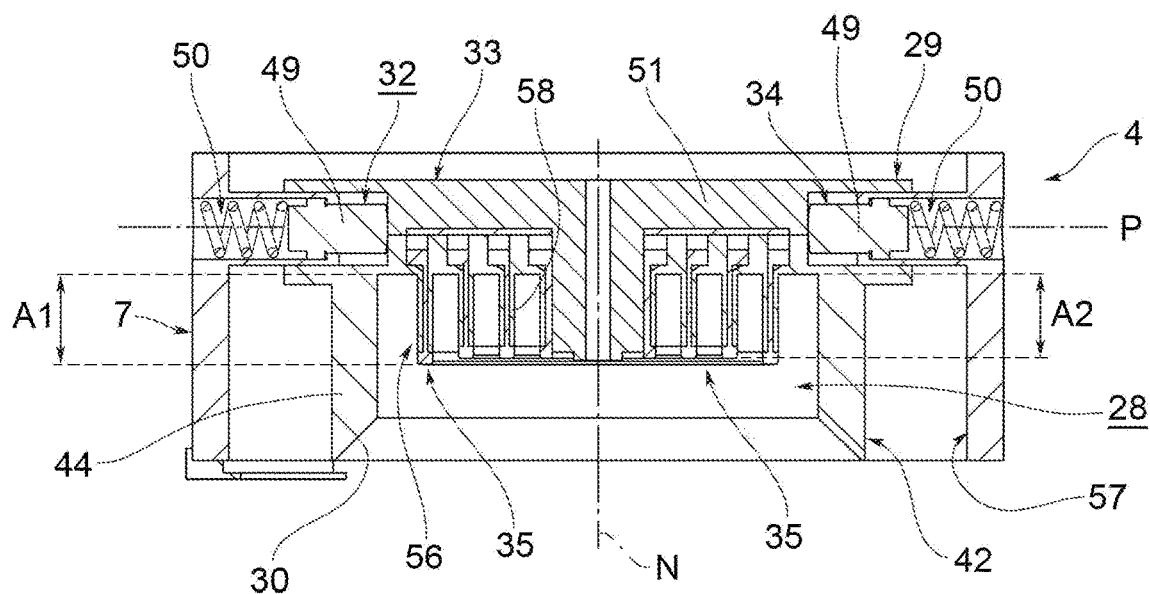

In accordance with one embodiment, one between a first or second electrical connector 4 comprises a floating support device 29 (for example visible in FIG. 19) of the first electrical connector with respect to the support body or of the second electrical connector 4 with respect to the vehicle, so that the connector 4 is movable in a displacement plane P.

In accordance with one embodiment, the displacement plane is substantially orthogonal relative to the distancing/coupling direction D discussed previously.

In accordance with one embodiment, the electrical connectors 3, 4 delimit coupling surfaces 30, 31 configured to mutually abut in the movement of the first electrical connector 3 towards the second condition.

In accordance with one embodiment, the coupling surface 30, 31 comprises at least one cone frustum surface, for example positioned at an entrance of the housing compartment 28.

In accordance with one embodiment, the coupling surface 30 is tapered towards the interior of the housing compartment 28.

In accordance with one embodiment, the coupling surface 30, 31 is delimited by a free edge 42, 43 of a connector wall 44, 45, for example substantially tubular.

In accordance with one embodiment, the connector wall 44, 45 circumscribes radially and/or axially (relative to the axes M, N discussed below) the electrical tracks 35, 36.

In accordance with one embodiment, at least one coupling surface 30, 31 makes a cam surface to actuate the electrical connector 3, 4 in the displacement plane P through the floating support device 29. According to this variant, the mechanical centring means comprise the floating support device 29 and the coupling surfaces 30, 31.

Therefore, even if the other electrical connector 3 and the housing compartment 28 were not perfectly aligned, in this variant the coupling surfaces could work axially to each other (to reach the second coupling condition), in order to adjust the mutual transverse position of the connector and of the compartment.

In other words, the coupling surface 30, 31 provides for the axial motion of the actuating means 9 to be transformed into a transverse or orthogonal motion (in the displacement plane P) of the connector associated with the floating support device 29.

In accordance with one embodiment, the floating support device 29 comprises:
i) a flange for fastening to the support body or a support element 7 of the second connector 4 to the vehicle, which delimits an internal compartment 32;
ii) a centring member 33, to which the electrical connector 4 is fastened and at least partially housed in the internal compartment 32 with possibility of movement in the displacement plane P between a resting position and at least one working position, and vice versa;
iii) elastic centring means 34, distributed around the centring member 33 to constantly displace it in the resting position.

In this way, a displacement of the centring member 33 outside the resting position takes place in contrast to the action of the means 34, which will thus tend to bring back—when free from outside constraints—the electrical connector from the working position to the resting position.

In accordance with one embodiment, the possibility of motion of the centring member 33 can take place in any direction of the plane P, in particular at 360° in any radial direction relative to the direction D.

In the embodiments shown, the resting position is a substantially central position of the centring member 33 in the inner compartment 32, while the working position is substantially eccentric.

In accordance with one embodiment, the fastening flange or the support element 7 delimit the internal compartment annularly.

Referring for example to FIG. 21, in one variant the centring member 33 could comprise a pair of guiding elements 46, 47 (for example in the form of annular lips) between which an engagement portion 48 of the aforesaid flange or element 7 (for example in the form of a radial shelf) is positioned, so as to allow a movement of the member 33 in the plane P.

In accordance with one embodiment, the elastic centring means 34 could comprise at least one thrust member 49—for example a pin—constantly moved by the elastic means 50 (shown only schematically in FIG. 19) towards the centring member 33.

In accordance with one embodiment, the elastic centring means 34 are positioned circumferentially along the fastening flange or along the support element 7, for example with constant pitch, and work by pushing towards the internal compartment 32.

In accordance with one embodiment, in the second condition (for example see FIG. 21), the electrical connectors 3, 4 abut each other axially, along or parallel to the direction D of distancing/coupling of the first electrical connector 3, but they have transverse/orthogonal play relative to said direction D. Therefore, the second condition is maintained exclusively by the actuating means 9.

In other words, in this variant there are no mechanical locking means that work between the connectors 3, 4 (for example by shape), because otherwise the possibilities of connection between the connectors, highly variable by virtue of the positioning of the vehicle with respect to the support body 10, would be drastically reduced.

In accordance with one embodiment, the electrical connectors 3, 4 delimit central axes or connector axes M, N which develop parallel or along the direction D of distancing/coupling, and comprise one or more electrical tracks 35, 36 which develop around the connector axis M, N, so as to achieve an electrical connection in any angular position between the connectors 3, 4.

In accordance with one embodiment, the at least one electrical tracks 35, 36 is annular and concentric relative to the connector axis M, N.

In accordance with one embodiment, at least one electrical connector 3, 4 comprises a bottom wall 51, 52 from which the connector axis M, N develops in a substantially orthogonal direction.

In accordance with one embodiment, the bottom wall 51, 52 is parallel to the displacement plane P.

In accordance with one embodiment, an electrical connector 3 comprises at least one electrical track 36 comprising at least three electrical contacts 37—for example in the form of a pin or lamina—distributed around a circumference C centred on the connector axis M.

In accordance with one embodiment, the electrical track 36 comprises three electrical contacts 37 for each polarity.

Figure 15:
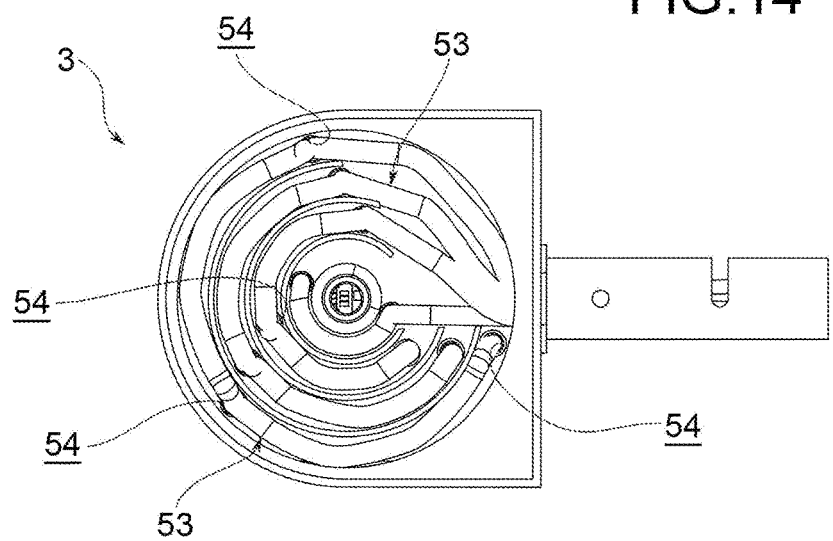

In accordance with one embodiment (for example, see FIG. 15), the at least three electrical contacts 37 of each electrical track 36 are cabled through a single conductor 53, which develops around the connector axis M.

More specifically, the connector 3, 4 could comprise a bottom wall 51, 52 which physically divides the conductor 53 and the electrical contacts 37, and which delimits pass-through holes 54 for electrically connecting the contacts with the conductor.

In accordance with one embodiment, the conductor 53 (or the plurality of conductors) could be made to transit externally to the connector 3, 4 through a cable conduit 55.

In accordance with one embodiment, the electrical contacts 37 are axially movable in a mutually independent manner so as to achieve an electrical connection even when the connector axes M, N are mutually incident.

In other words, in this variant the connectors 3, 4 are specifically designed so that the electrical connection can take place even when the axes M, N are not parallel. For example, this circumstance could take place if the parking surface S is not perfectly planar, but places the vehicle (and hence the second connector 4) in a position that is slightly imbalanced towards one pair of wheels, for example towards the right pair of wheels.

In this variant, the electrical contact is in any case assured by virtue of the independence of the three electrical contacts 37 which may protrude more or less towards the electrical track of the other connector 4 according to the necessary axial distance.\

In accordance with one embodiment, the electrical contacts 37 could be forced constantly externally to the connector 3 (through elastic means, not show), and could be axially retractable (for example towards the bottom wall 52) to allow the aforementioned axial mobility.

In accordance with one embodiment, at least one pair of electrical contacts 37 of different polarity is radially separated by a separating wall 38 made of electrically inert material.

In accordance with one embodiment, the separating wall 38 or the plurality of separating walls is substantially tubular.

In accordance with one embodiment, the at least one separating wall 38 is concentric to the connector axis M.

In accordance with one embodiment, the equipment 1 comprises a plurality of separating walls 38 which determine between them an intermediate space 39, for example annularly shaped. In this space 39 at least one electrical contact (for example the three electrical contacts 37 of the same polarity) is advantageously positioned.

In accordance with one embodiment, the cross section of the intermediate space 39 and the conformation of the contacts of the other electrical connector 4 are selected in such a way that the second coupling condition is reachable to mutually inclined connector axes M, N.

In other words, the breadth and depth of the intermediate space 39 will have to be related to the conformation of the contacts of the other electrical connector 4, to allow an electrical connection even in the presence of inclination of the connectors.

It is specified that, within this description, the term "conformation of the contacts" shall include the following parameters: axial height A1, A2 of the electrical tracks 35, radial distance between adjacent electrical tracks 35, thickness of the electrical tracks 35 or combination thereof.

In accordance with one embodiment, an electrical connector 4 comprises at least two electrical tracks 36 of different polarity, concentric relative to the connector axis N.

In accordance with one embodiment, the electrical tracks 36 could be positioned at free edges 56 of tubular conductors 58.

In accordance with one embodiment, the electrical tracks 36 have progressively decreasing axial heights A1, A2 from the radially outermost track (relative to the axis N) towards the radially innermost track, so that the electrical connection with the other connector 3 is sequential, pole by pole.

By virtue of the greater protrusion of the radially outermost track, the first electrical contact can take place exclusively thereat. The contact of the subsequent polarities may take place for example thanks to the axial mobility discussed in the preceding paragraphs.

In accordance with one embodiment, the equipment 1 comprises means for the fine adjustment of the position of the first electrical connector 3 relative to the second electrical connector 4.

These means are then delegated to make small adjustments (of the order of a few millimetres) to complete the second coupling condition.

In accordance with one embodiment, the fine adjustment means comprise at least one source of waves, for example mechanical waves or electromagnetic waves, associated with one 4 of the connectors, and a detector 41 of the waves emitted by the source associated with the other 3 connector.

In accordance with one embodiment, the source of waves 40 could be a miniaturised source, e.g. with LED.

In accordance with one embodiment, the source of waves 40 could be infrared.

In accordance with one embodiment, the source 40 and the detector 41 are positioned at the electrical tracks 35, 36 of the connectors, for example centrally thereto.

In accordance with one embodiment, the source 40 and the detector 41 are annularly surrounded by the electrical tracks 35, 36, and optionally by the separating walls 38.

In accordance with one embodiment, the first electrical connector 3 is rotatable (around the axis of rotation R1 shown for example in FIG. 8) relative to the support body 10 or relative to an arm 25 of the actuating means 9, between a first position (FIG. 8) in which said connector 3 faces the second electrical connector 4, and a second position (FIG. 7) in which said first connector 3 faces the support body 10, and vice versa.

In accordance with one embodiment, the first electrical connector 3 is rotatable by 180°.

In accordance with one embodiment, the first electrical connector 3 is rotatable by an angle not greater than 180°, so as to prevent the conductors 53 from tangling and being potentially damaged.

Therefore, according to said embodiments, the equipment is adapted to also operate outdoors, and hence exposed to environmental phenomena such as rain or snow, without however the risk of causing malfunctions due to the entry of liquids.

In accordance with one embodiment, the first electrical connector 3 could comprise a second support element (for example similar to the support element 7 discussed above) which could delimit a second cavity in which electrical tracks 36 of said first connector 3 are completely housed.

In accordance with one embodiment, the first connector 3 could comprise a second closing element (not shown) superposed to the second cavity so as to close it), and openable so as to allow access to the electrical tracks 36.

In accordance with one embodiment, the second closing element could be motorised between the open position and the closed position, and vice versa.

In accordance with one embodiment, the second closing element could close the second cavity in a sealed manner. With regard to the definition of "sealed", reference should be made to the above description.

For example, in accordance with one embodiment, the second closing element could close the second cavity in a substantially watertight manner.

The support body 10 can be positioned on a parking surface S of the vehicle 2 and its bulk can be contained underneath the vehicle 2. In other words, the body 10 has smaller dimensions than the space delimited underneath the vehicle 2 i.e. between the parking surface S (for example shown schematically in FIG. 10) and the under-body surface 5 of the vehicle 2.

In other words, the term "smaller dimensions than the space delimited underneath the vehicle" shall mean a total bulk of the support body that is such as not to constitute an obstacle for the positioning of the vehicle 2 above said body, and hence on the parking surface.

In yet other words, the term "smaller dimensions than the space delimited underneath the vehicle" shall mean a bulk of the body 10 that is sufficiently reduced or compact to be underneath the vehicle (and in particular underneath the under-body surface 5), in the absence of contacts with the vehicle or with the under-body surface 5.

It should be specified that the term "parking surface S" shall mean any surface on which the vehicle transits and is parked. For example, the parking surface S can be defined by a parking area or by a garage or by any other base provided for the transit preferably of wheeled vehicles.

Advantageously, the support body 10 has a support base 11 configured to be fastened to the parking surface of the vehicle 2 without altering or modifying the parking surface.

In accordance with an embodiment, the support body 10 could be at least partially positioned vertically underneath the parking surface S, for example at least partially embedded in a material delimiting said surface (for example concrete, asphalt, or the like).

In accordance with one variant, the systems for fastening the support base 11 to the parking surface can be any, provided they are adapted to fasten the support body 10 without having to intervene directly on the parking surface, thus avoiding operation to adapt the surface.

For example, fastening screws can be provided that pass through holes obtained on the support base 11 and directly connected to the ground.

Figure 1:
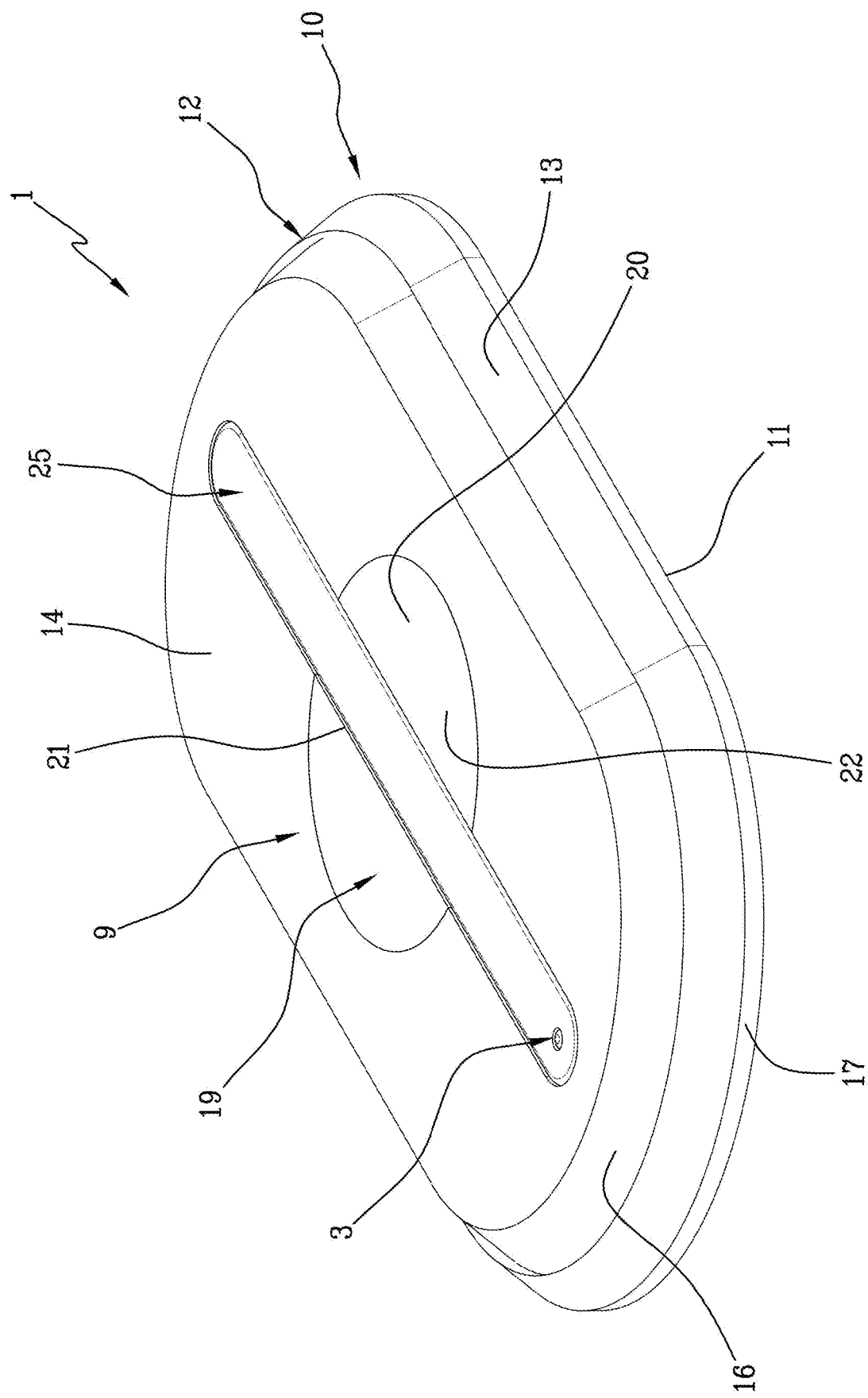
FIG. 1 is a perspective view of the power equipment for electric vehicles according to the present invention and in a respective resting configuration.

In further detail, in one embodiment the support body 10 comprises a box-like element 12 having substantially flat conformation and defining respective peripheral edges 13 that are flared and tapered starting from the support base 11 towards an upper surface 14 opposite to the base 11 (FIG. 1).

In one embodiment, the box-like element 12 has substantially cone frustum conformation, preferably with oval section. It should be noted that this configuration has the advantage of avoiding any sharp edges or rises which, if treaded upon by the wheels of the vehicle, could cause them to be damaged.

In this context, the peripheral edges 13 tapered upwards advantageously define inclined plane that can easily be overcome by the wheels of the vehicle 2.

Figure 3:
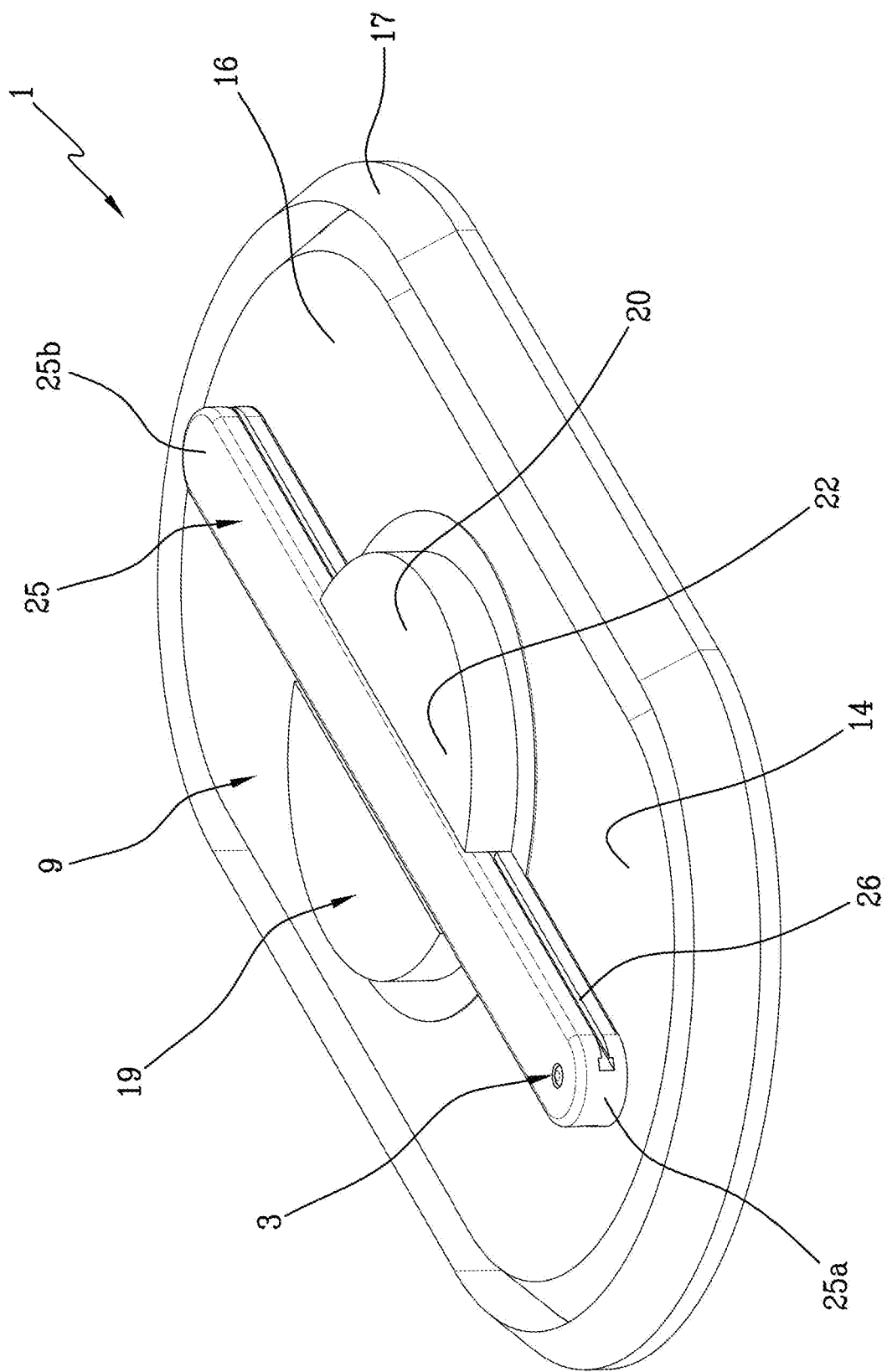
FIG. 3 is a perspective view and in an operating condition of the equipment of FIG. 1.

With particular reference to FIGS. 1 through 3, it should be noted that in one variant the box-like element 12 comprises: a first fixed portion 17, defining the aforementioned support base 11 and fastened to the parking surface S; and a second portion 16 slidable relative to the first portion 17 between an extended condition (FIG. 1) in which it defines a containment compartment 18 (FIG. 2) of the actuating means 9 in the first condition, and a retracted position in which it is contained within the first portion 17 (FIG. 3).

The actuation of the second portion 16 within the first portion 17 is for example carried out by respective motor means not described and illustrated in detail because they are of a known type.

In accordance with the previous variant, when the second portion 16 is retracted within the first portion 17, the aforementioned actuating means are consequently uncovered.

It should be specified that the described construction of the box-like element 12 with the two portions 16, 17 is optional because, in accordance with other embodiments, the support body 10 could comprise a body case (not shown; totally omitted by the variants of FIGS. 7-9) to house the first connector 3 and the actuating means 9 in the aforementioned first condition.

In accordance with one embodiment, the support body 10 or the body casing could be carriageable, i.e. able to withstand the crushing forces generated by the vehicle. In accordance with one variant, the actuating means 9 comprise a support turret 19 movable according to a first direction A, for example vertical, away from/towards the support body 10. In addition, the turret 19 is movable according to a rotation motion around a respective longitudinal axis X coinciding with, or parallel to, the aforementioned direction A.

In accordance with one variant (for example, see FIG. 3 or FIG. 4), the turret 19 consists of a cylindrical body 20 with circular section and provided with a groove 21 obtained on a respective top surface 22 of the body 20 itself. It should be noted that the top surface 22, in the first condition of the first connector 3 is coplanar to the upper surface 14 of the box-like element 12 (FIGS. 1 and 2).

In accordance with an additional variant, the turret 19 could comprise a lifting member 23 comprising a pantograph lever mechanism 24 configured to move the first electrical connector 3 closer/farther away relative to the support body 10.

According to one variant, the groove 21 develops transversely to the longitudinal axis X and develops from respective opposite parts of the top surface 22.

In accordance with one embodiment, the turret 19 comprises the lifting member 23 of the cylindrical body 20 contained in the cylindrical body 20 itself and able to raise/lower the cylindrical body 20 relative to the support body 10.

In accordance with one embodiment, the turret 19 comprises a support arm 25 of the first electrical connector, and a translation guide 27, 27' of said arm 25 relative to the support body 10.

Figure 11:
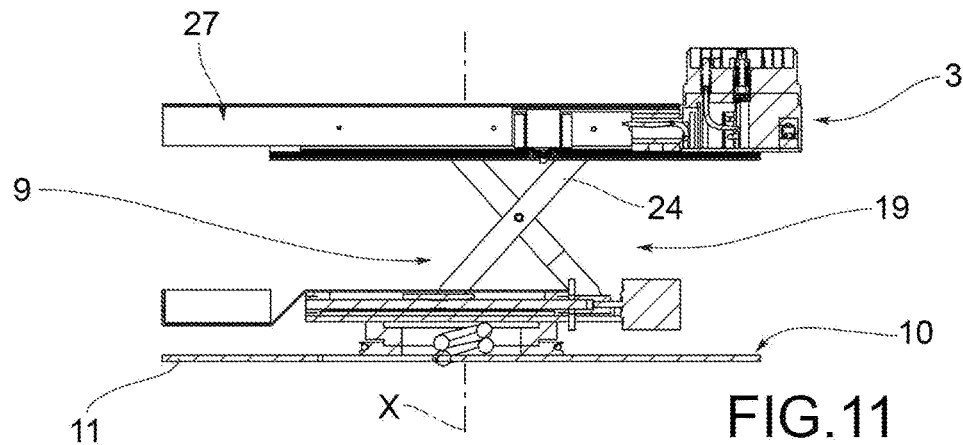
Figure 12:
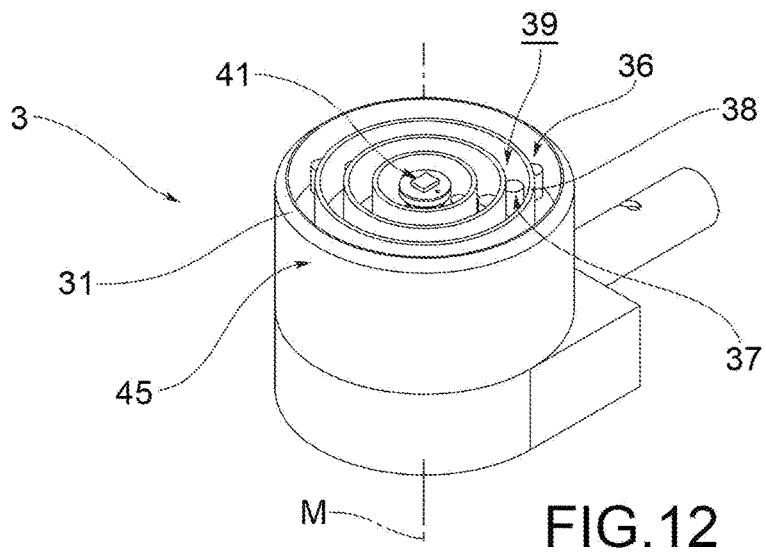
FIGS. 12, 13, 14, 15 show a first electrical connector respectively in a top perspective view, in a top plan view, in longitudinal section and in a bottom plan view, wherein the aforesaid section was obtained along the plane XIV-XIV shown in FIG. 13 and in which in the bottom view a casing of the connector was omitted for the purpose of showing its wirings.
Figure 13:
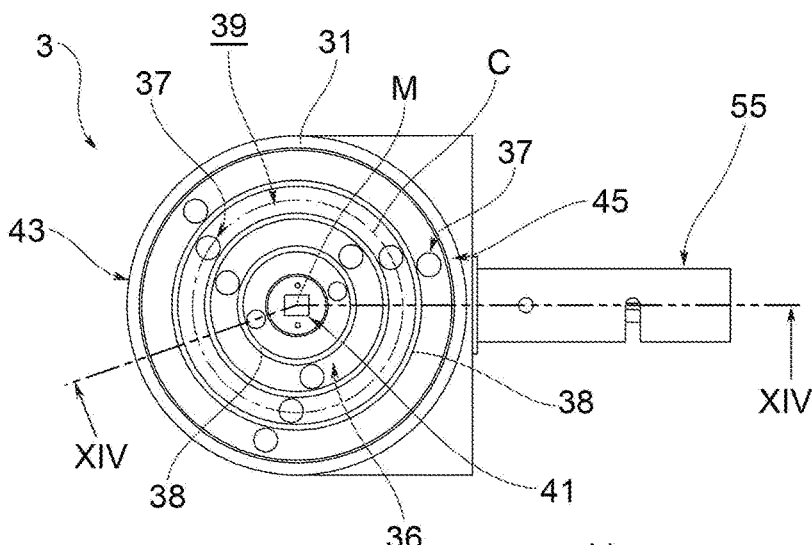
Figure 14:
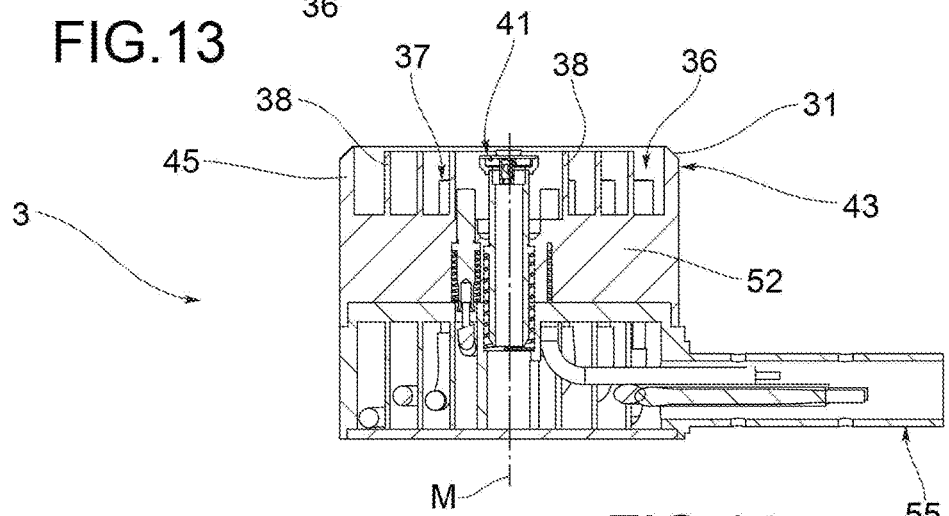

In the variant illustrated for example in FIG. 11, the translation guide 27, 27' is fastened to the lifting member 23, and in particular to the pantograph leverage mechanism 24.

Figure 4:
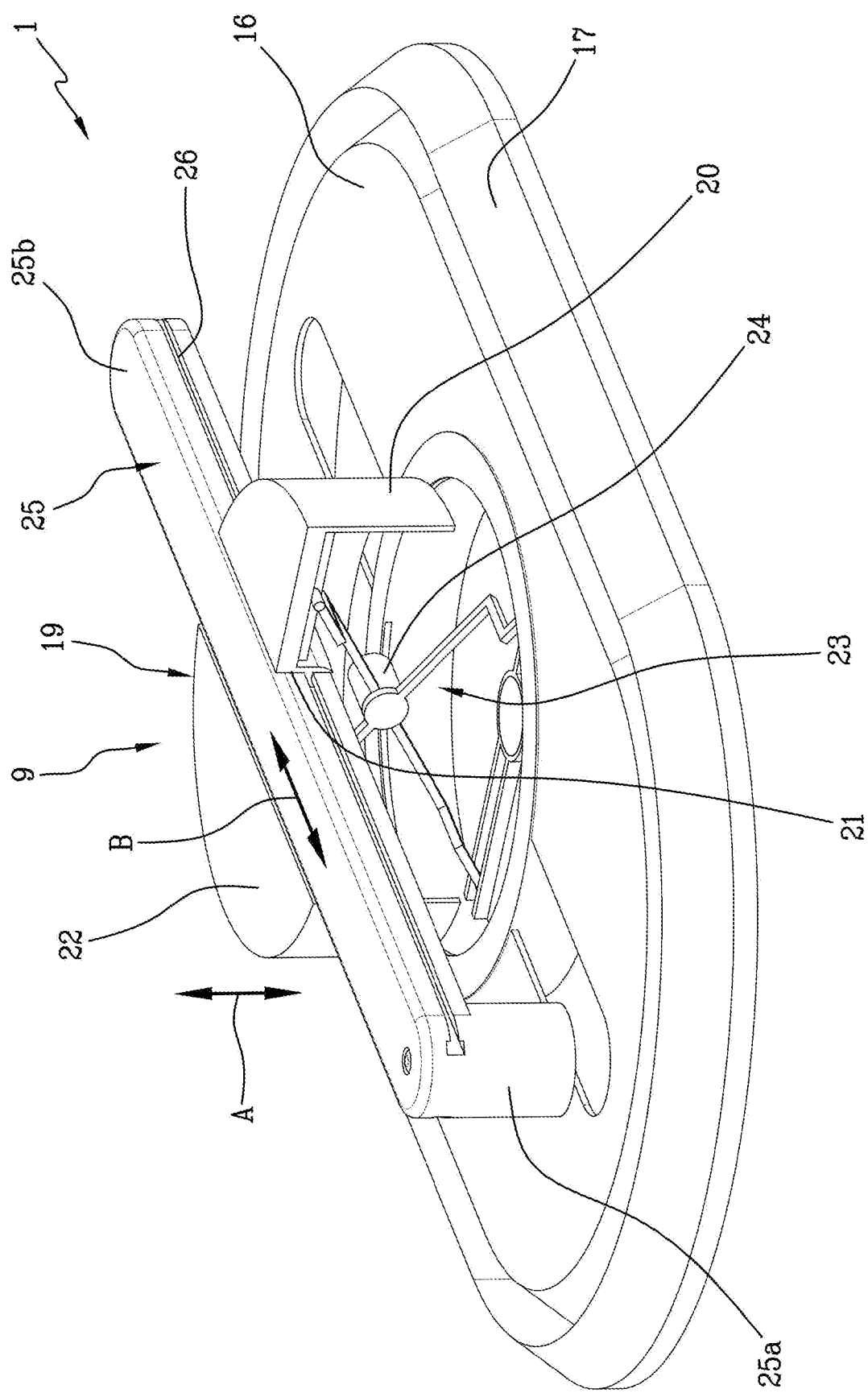
FIG. 4 shows a perspective and partially sectioned view in an operating condition of the equipment of FIG. 1.
Figure 5:
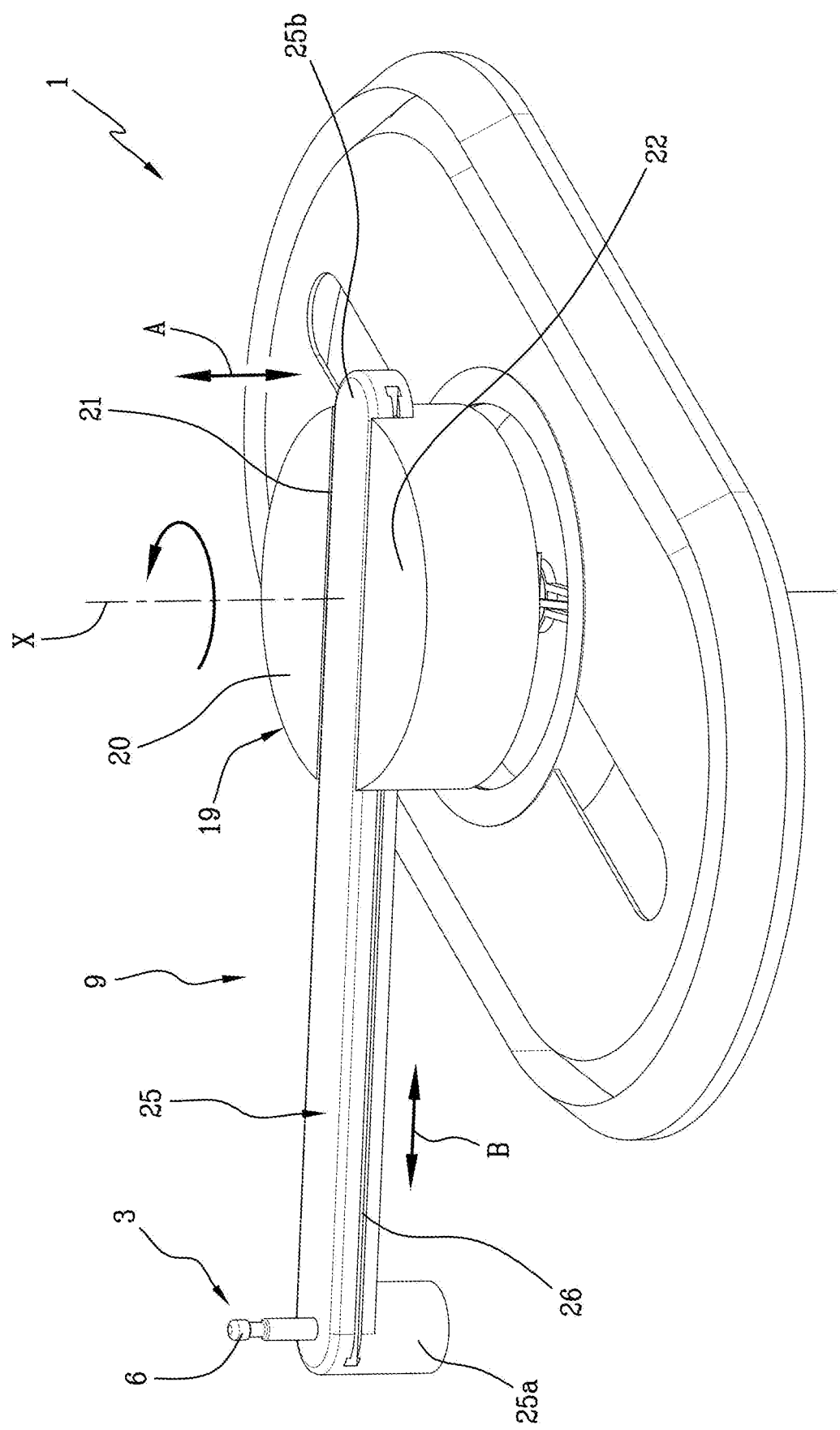
FIG. 5 shows a perspective view in a charging condition of the equipment of FIG. 1.

Preferably, as is better illustrated in FIG. 4, the lifting member 23 comprises the pantograph leverage mechanism 24, appropriately motorised, to define the movement (for example the raising/lowering) of the first electrical connector 3 and/or of the cylindrical body 20. The leverage mechanism 24, which is not described in detail, can also be replaced with any other automatic actuation system able to displace the connector 3 and/or the cylindrical body 20, for example vertically, according to a to-and-fro motion.

In addition, the turret 19 is also provided with a rotation member 2 (shown in FIGS. 7-10) able to rotate the first electrical connector 3 and/or the cylindrical body 20 around the axis of longitudinal development X, specifically relative to the support base 11.

In accordance with one variant, the rotation member 2 comprises a platform to which the lifting member 23 is fastened. More specifically, the pantograph leverage mechanism 24 could be connected at one end to said platform.

The actuating means 9 further comprise the arm 25, for example housed in the groove 21, having longitudinal development that is perpendicular to the axis of rotation of the cylindrical body 20 or of the turret 19.

In accordance with one embodiment, the arm 25 is geometrically coupled to the support body 10 or to the body casing in the first condition, in particular so as to completely close a compartment delimited by said body/casing.

The arm 25 is slidable along the translation guide 27, 27' or within the groove 21, along a direction B corresponding to the respective longitudinal development according to a to-and-fro motion.

The actuation of the arm 25 is carried out by respective motor means (not illustrated and described because they are of a known type) and by an optional sliding guide 26 obtained laterally to the arm 25.

In this way, the arm 25 supported by the cylindrical body 20 or by the lifting member 23 is slidable within the groove 21 or along the translation guide 27, 27' between a condition of maximum extension (FIG. 5) in which it projects in overhang (for example from the groove 21) and a condition of minimum extension (FIGS. 1-3, and FIGS. 7-9) in which it has respective opposite ends 25a, 25b both projecting outside the groove 21 or the guide 27, 27'.

Advantageously, the first connector 3 is positioned at a first end 25a of the arm 25.

In particular, in accordance with one embodiment, the first end 25a has a compartment for containing the pin 6 and respective lifting means (not illustrated because they are of a known type) to actuate the pin 6 itself between a retracted condition (FIGS. 1 through 4) in which it is completely contained in the arm and an extended condition (FIG. 5) in which it projects from the arm 25 and extends along a parallel direction to the axis of rotation X.

Advantageously, the pin 6 is extracted and lifted by the arm 25 to enable its insertion into the aforementioned hole 8. In accordance with an additional embodiment, the first connector 3 realises an extension of the arm 25 (for example, see FIG. 7 or FIG. 8). The equipment 1 further comprises an electronic unit for locating the second connector 4, configured to command the actuating means 9 of the first connector 3 according to the position of the second connector 4.

In accordance with one variant, the electronic unit can for example consist of one or more sensors positioned on the connectors 3, 4 able to identify the mutual positioning and the relative distances in order to consequently actuate the first connector relative to the second.

The sensors can be electromagnetic or magnetic or another type of locating system.

In accordance with one additional variant, the locating unit comprises a device for transmitting at least one identification signal associated with the first connector 3 (or with the second connector 4), and a device for receiving said identification signal associated with the second connector 4 (or with the first connector 3). According to this embodiment, the actuating means 9 can be commanded by the locating unit on the basis of the identification signal or of their plurality. The purposes of the present invention are also solved through a set of first 3 and of second 4 electrical connector constructed according to any of the embodiments illustrated above.

In use, the equipment 1 is activated when the vehicle 2 is positioned above it (FIG. 6).

In this situation, the electronic unit detects the positioning of the second connector 4 and activates the equipment to actuate the first connector 3 and to realise the electrical connection (for example inserting the pin 6 into the hole 8).

In particular, starting from FIG. 1 in which the equipment 1 is a condition of non-utilisation, the first portion 17 is lowered inside the second portion 16 (FIG. 3) to uncover the turret 19.

Subsequently, the cylindrical body 20 is lifted away from the body 10 (FIG. 4).

At this point, the cylindrical body 20 is rotated around the axis X and the arm 25 extended from the groove 21 to align the first end 25a relative to the second connector 4. In this operation, the first end 25a of the arm 25 is positioned exactly underneath the second connector 4. The locating logic unit provides for the simultaneous movement of the arm 25 and of the cylindrical body 20 to determine the aforementioned alignment.

Once the first end 25a of the arm 25 is aligned with the second connector 4, the first connector 3 (for example in the form of pin 6) is lifted to define the insertion in the second connector 4 (for example in the hole 8).

At this point, the electrical connection that supplies power to the batteries of the vehicle 2 is defined.

Figure 7:
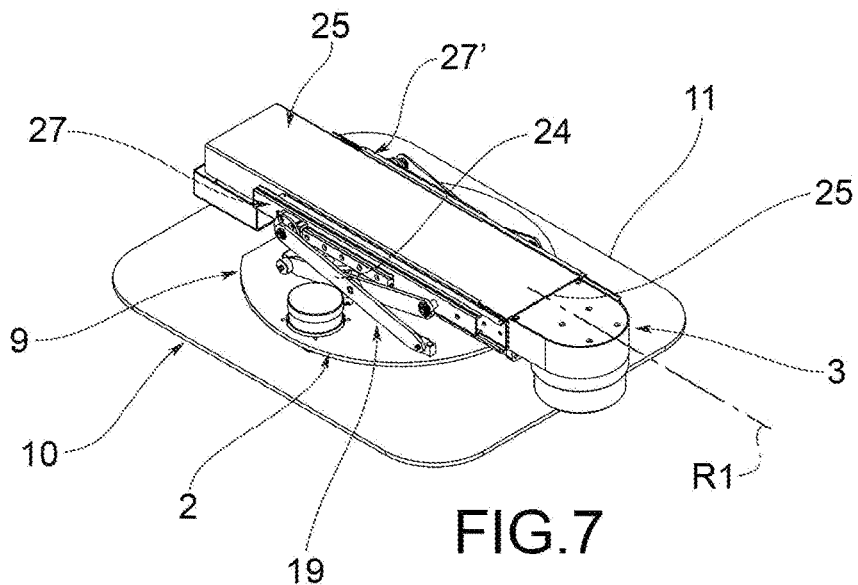
FIGS. 7, 8, 9 show perspective top views of another embodiment of the power equipment according to the present invention, respectively in two resting configurations, and in an operating condition, where FIGS. 8 and 9 differ mainly in the orientation of the first electrical connector.

Once the charging of the batteries is completed, the equipment automatically returns to the resting configuration (FIG. 1, or FIG. 7).

The present invention solves the problems describes in the prior art and provides numerous advantages.

In the first place, the equipment 1 is structurally simple, and hence with low costs, as is the method for coupling the two connectors. This coupling simplicity derives from the fact that—in some embodiments—the axis of the first connector 3 and the axis of the second connector 4 are always perpendicular to the ground and hence parallel to each other.

This situation makes it unnecessary to have vision systems that identify how the outlet is oriented. Therefore, an electromagnetic locating system can be utilised, for example with single receiver, which is much simpler than known vision systems. Moreover, the equipment 1 does not need perfect alignment when the vehicle 2 is stopped but autonomously goes to locate the second connector 4 under the vehicle 2.

Advantageously, very small dimensions of the equipment 1 can be maintained, with the consequent advantages in terms of volumes.

In this regard, it should be noted that not only does the cone frustum shape of the equipment 1 not encumber the parking area, and hence makes it easy to park the vehicle 2, but it can also be treaded upon by the wheels of the vehicle 2 without causing any damage thereto.

The invention claimed is:
1. Power equipment for electric vehicles, comprising:
a first electrical connector connected to a power supply grid;
a second electrical connector connected to a battery of the vehicle and configured to couple mechanically with the first electrical connector;
wherein the electrical connectors delimit central axes or connector axes which develop parallel or along a direction of distancing/coupling of the first electrical connector relative to the second electrical connector and comprise one or more electrical tracks which develop around the connector axis so as to realise an electrical connection in any angular position between the connectors;
wherein at least one electrical connector comprises at least one electrical track comprising at least three electrical contacts distributed around a circumference centred on said axis, and in which said electrical contacts are axially movable in a mutually independent manner so as to make an electrical connection even when the connector axes are mutually incident; and, wherein at least a pair of electrical contacts of different polarity is radially separated by a separating wall, for example tubular shaped, made of electrically inert material;

a plurality of separating walls which delimit between them an intermediate space, in which at least one electrical contact is positioned, the cross section of said space and the conformation of the contacts of the other electrical connector being selected in such a way that the second coupling condition is reachable with mutually inclined connector axes;

actuating means of said first connector for actuating the first connector itself between a first condition in which it is removed from the second connector and a second condition in which it is coupled to the second connector to determine a passage of current from the electric grid to said battery; and a support body of said actuating means, said first connector and said actuating means in the first condition being contained in the volume defined by said support body;

wherein the support body has a support base configured to be fastened to a parking surface of the vehicle and underneath the vehicle itself; said body having smaller dimensions than the space delimited underneath the vehicle.

2. Equipment according to claim 1, wherein the support body comprises a box-like element having flat conformation and defining respective peripheral edges flared and tapered starting from the support base towards an upper surface opposite to the support base.

3. Equipment according to claim 1 wherein one between first or second electrical connector delimits a housing compartment in which the other electrical connector—second or first—is inserted at least in part in the second coupling condition, and wherein said equipment comprises mechanical centring means configured to align the other electrical connector and the housing compartment.

4. Equipment according to claim 3, wherein one between first or second electrical connector comprises a floating support device of the first electrical connector relative to the support body, or of the second electrical connector relative to the vehicle, so that said connector is movable in a displacement plane, and in which the electrical connectors delimit coupling surfaces configured to mutually abut in the movement of the first electrical connector towards the second condition.

5. Equipment according to claim 3 wherein at least a coupling surface makes a cam surface to actuate the electrical connector in the displacement plane through the floating support device, where the mechanical centring means comprise the floating support device and the coupling surfaces.

6. Equipment according to claim 4, wherein the coupling surface comprises at least one cone frustum surface positioned at an entrance of the housing compartment.

7. Equipment according to claim 6, wherein the coupling surface is tapered towards the interior of said compartment.

8. Equipment according to claim 4, wherein the floating support device comprises:
i) a flange for fastening to the support body or to a support element of the second connector to the vehicle, which delimits an internal compartment;
ii) a centring member, to which the electrical connector is fastened and at least partially housed in the internal compartment with possibility of movement in the displacement plane between a resting position—for example substantially central—and at least one working position—for
iii) elastic centring means, distributed around the centring member to constantly displace it in the resting position.

9. Equipment according to claim 1, wherein, in the second condition, the electrical connectors mutually abut axially, along or parallel to a direction (D) of distancing/coupling of the first electrical connector (3), having transverse/orthogonal play relative to said direction such that said second condition is maintained exclusively by the actuating means.

10. Equipment according to claim 1, wherein the intermediate space is an annular space.

11. Power equipment for electric vehicles, comprising:
a first electrical connector connected to a power supply grid;
a second electrical connector connected to a battery of the vehicle and configured to couple mechanically with the first electrical connector;
actuating means of said first connector for actuating the first connector itself between a first condition in which it is removed from the second connector and a second condition in which it is coupled to the second connector to determine a passage of current from the electric grid to said battery; and
a support body of said actuating means, said first connector and said actuating means in the first condition being contained in the volume defined by said support body;
wherein the support body has a support base configured to be fastened to a parking surface of the vehicle and underneath the vehicle itself; said body having smaller dimensions than the space delimited underneath the vehicle;
wherein, in the second condition, the electrical connectors mutually abut axially, along or parallel to a direction (D) of distancing/coupling of the first electrical connector (3), having transverse/orthogonal play relative to said direction such that said second condition is maintained exclusively by the actuating means; and,
wherein an electrical connector comprises at least two electrical tracks of different polarity, concentric relative to said connector axis, said tracks having progressively decreasing axial heights from the radially outermost track towards the radially innermost track, so that the electrical connection with the other connector is sequential, pole by pole.

12. Equipment according to claim 11, comprising means for finely adjusting the position of the first electrical connector relative to the second electrical connector, said means comprising at least one waves source, for example of mechanical waves or of electromagnetic waves, associated with one of said connectors, and a detector of the waves emitted by said source associated with the other connector, said source and said detector being positioned at the electrical tracks of said connectors.

13. Equipment according to claim 1, wherein the first electrical connector is rotatable relative to the support body or relative to an arm of the actuating means between a first position in which said connector faces the second electrical connector, and a second position in which said first connector faces the support body, and vice versa.

14. Equipment according to claim 1, further comprising an electronic unit for locating said second connector, configured to command said actuating means of the first connector according to the position of the second connector, said locating unit comprising a device for transmitting at least one identification signal associated with the first connector or with the second connector, and a device for receiving said identification signal association with the second connector or with the first connector, and wherein the actuating means can be commanded by said electronic unit on the basis of the identification signal or of their plurality.

15. Set of first and of second electrical connector constructed according to claim 3.

* * * * *